(12) United States Patent
Lu et al.

(10) Patent No.: US 9,367,781 B2
(45) Date of Patent: Jun. 14, 2016

(54) METHOD AND SYSTEM FOR ENCODING AND DECODING MOBILE PHONE BASED TWO-DIMENSIONAL CODE

(71) Applicant: HUIZHOU TCL MOBILE COMMUNICATION CO., LTD., HuiZhou, Guangdong (CN)

(72) Inventors: Zongmin Lu, HuiZhou (CN); Wei Li, HuiZhou (CN); Kai Zhang, HuiZhou (CN); Wenzhen Miao, HuiZhou (CN)

(73) Assignee: HUIZHOU TCL MOBILE COMMUNICATION CO., LTD., HuiZhou, Guangdong (CN)

(*) Notice: Subject to any disclaimer, the term of this patent is extended or adjusted under 35 U.S.C. 154(b) by 0 days.

(21) Appl. No.: 14/647,275

(22) PCT Filed: May 30, 2014

(86) PCT No.: PCT/CN2014/078914
§ 371 (c)(1),
(2) Date: May 26, 2015

(87) PCT Pub. No.: WO2015/103838
PCT Pub. Date: Jul. 16, 2015

(65) Prior Publication Data
US 2016/0012325 A1    Jan. 14, 2016

(30) Foreign Application Priority Data
Jan. 10, 2014    (CN) .......................... 2014 1 0011709

(51) Int. Cl.
*G06F 17/00*    (2006.01)
*G06K 19/06*    (2006.01)
(Continued)

(52) U.S. Cl.
CPC .... *G06K 19/06112* (2013.01); *G06F 17/30879* (2013.01); *G06F 17/30887* (2013.01);
(Continued)

(58) Field of Classification Search
CPC .................. G06K 19/06037; G06K 19/06103; G06K 19/06112; G06K 1/121; G06K 7/1417; G06K 7/1473; H04N 19/70; H04N 19/0006; H04N 19/00169; H04N 19/00327; H04N 19/00369; H04N 19/00442; H04N 19/00769
USPC ............... 235/375, 472.01–472.03, 493, 492, 235/486, 487
See application file for complete search history.

(56) References Cited

U.S. PATENT DOCUMENTS

| 6,681,055 B1 | 1/2004 | Sato | |
| 2002/0097411 A1* | 7/2002 | Roche | ............ H04N 21/234327 358/1.9 |
| 2003/0067627 A1* | 4/2003 | Ishikawa | ............ H04N 1/32128 358/1.15 |

(Continued)

FOREIGN PATENT DOCUMENTS

| CN | 101882211 A | 11/2010 |
| CN | 103377390 A | 10/2013 |
| CN | 103778452 A | 5/2014 |

*Primary Examiner* — Thien M Le
(74) *Attorney, Agent, or Firm* — Ladas & Parry LLP (57) ABSTRACT

A method and a system for encoding and decoding a mobile phone based two-dimensional code are provided, by means of obtaining the data information inputted by a user and transforming the data information into a two-dimensional code the encoding of the two-dimensional code is embodied. Furthermore, by means of performing binarization processing on the two-dimensional code image to obtain the binary data information, which is parsed into text information by using the preset decoding algorithm, to facilitate mobile phone users in information exchanging using a two-dimensional code.

5 Claims, 3 Drawing Sheets

(51) Int. Cl.
  *G06K 17/00* (2006.01)
  *G06F 17/30* (2006.01)
  *G06K 7/14* (2006.01)
  *H04W 4/12* (2009.01)
  *H04W 4/16* (2009.01)

(52) U.S. Cl.
  CPC ............ *G06K7/1417* (2013.01); *G06K 7/1473* (2013.01); *G06K 17/0022* (2013.01); *G06K 19/06037* (2013.01); *H04W 4/12* (2013.01); *H04W 4/16* (2013.01)

(56) References Cited

U.S. PATENT DOCUMENTS

| | | | |
|---|---|---|---|
| 2004/0039810 A1* | 2/2004 | Donescu | H04N 21/21 709/223 |
| 2007/0260558 A1* | 11/2007 | Look | G06Q 20/20 705/76 |
| 2011/0176601 A1* | 7/2011 | Fukuhara | H04N 21/23106 375/240.01 |
| 2015/0090791 A1* | 4/2015 | Zhang | G06K 7/1417 235/462.04 |

* cited by examiner

METHOD AND SYSTEM FOR ENCODING AND DECODING MOBILE PHONE BASED TWO-DIMENSIONAL CODE

BACKGROUND OF THE INVENTION

1. Field of the Invention

The present invention relates to mobile terminal equipment and, more particularly, to a method and a system for encoding and decoding a mobile phone based two-dimensional code.

2. Description of Prior Art

The two-dimensional code is a black-and-white pattern, which is a specific geometry pattern spread following a certain regularity in a plane, and its application fields are wide because data can be stored in its horizontal and vertical directions.

The smart platform typically supports creation and recognition of the two-dimensional code, and provides a very user-friendly experience and brings users convenience in daily life. However, two-dimensional code related software is not installed on a common mobile phone, especially a feature phone generally does not have two-dimensional code software installed, thereby resulting in failure of the creation of a two-dimensional code during use of the mobile phone and inconvenience in daily life.

As the two-dimensional code has been used in more and more various fields, the defect of the mobile phone that does not support the creation and recognition of a two-dimensional code is increasingly apparent.

Therefore, there is a need for providing a method of encoding and decoding a mobile phone based two-dimensional code to provide convenience in daily life due to the above described defect existing in the prior art.

SUMMARY OF THE INVENTION

Aiming at the above described defect of a mobile phone that does not support encoding and decoding of a two-dimensional code existing in the prior art, the object of the present invention is to provide a method and a system of encoding and decoding a mobile phone based two-dimensional code. The technical solutions of the present invention are as described below.

A method for encoding a mobile phone based two-dimensional code comprises:

obtaining data information inputted by a user and converting the data information into encoded characters, wherein the data information includes character information for a target two-dimensional code and data corresponding to an error correction level of the two-dimensional code predetermined by the user;

transforming the encoded characters into a bitmap file containing binary data according to a predetermined encoding rule;

obtaining the binary data contained in the bitmap file;

adjusting the bitmap file based on resolutions of preset layers; and placing the binary data information into each preset layer and transforming them into a two-dimensional code by superimposing the layers in order.

In the above method for encoding a mobile phone based two-dimensional code of the present invention, after the step of obtaining data information inputted by a user and converting the data information into the encoded characters, the method further comprises: calculating a matching version for transforming the data information into the two-dimensional code according to the error correction level predetermined by the user and a string length corresponding to the encoded characters.

In the above method for encoding a mobile phone based two-dimensional code of the present invention, after the step of placing the binary data information into the preset layers and transforming them into a two-dimensional code by superimposing layers in order, the method further comprises:

conserving the two-dimensional code as an image file and displaying the same.

A method for encoding a mobile phone based two-dimensional code comprises:

obtaining data information inputted by a user and converting the data information into encoded characters, wherein the data information includes character information for a target two-dimensional code and data corresponding to an error correction level of the two-dimensional code predetermined by the user;

transforming the encoded characters into a bitmap file containing binary data according to a predetermined encoding rule; and obtaining the binary data information contained in the bitmap file and transforming the bitmap file into a two-dimensional code by superimposing layers in order according to the binary data information.

In the above method for encoding a mobile phone based two-dimensional code of the present invention, after the step of obtaining data information inputted by a user and converting the data information into the encoded characters, the method further comprises: calculating a matching version for transforming the data information into the two-dimensional code according to the error correction level predetermined by the user and a string length corresponding to the encoded characters.

In the above method for encoding a mobile phone based two-dimensional code of the present invention, after the step of obtaining the binary data information contained in the bitmap file, the method further comprises:

adjusting the bitmap file based on a resolution of each preset layer; and placing the binary data information into each preset layer according to a predetermined rule and transforming the binary data information into a two-dimensional code by superimposing layers in order.

In the above method for encoding a mobile phone based two-dimensional code of the present invention, after the step of transforming into a two-dimensional code by superimposing layers in order, the method further comprises: conserving the two-dimensional code as an image file and displaying the same.

In the above method for encoding a mobile phone based two-dimensional code of the present invention, the binary data being 0 or 1 is placed into each preset layer in light of a predetermined rule which is a 0 representing white and a 1 representing black, and the layers are superimposed orderly after the binary data has been placed into the layers.

A method for decoding a mobile phone based two-dimensional code comprises:

obtaining a two-dimensional code image and placing the two-dimensional code image into preset layers after the obtained two-dimensional code image has been adjusted depending on a resolution of each layer;

performing binarization processing on the two-dimensional code image which has been placed into the layers to generate a black-and-white image;

quantizing the black-and-white dots containing in the black-and-white image into binary data information;

identifying the version and the error correction level of the two-dimensional code contained in the two-dimensional code image according to the binary data information;

parsing the binary data information into text information by using a preset decoding algorithm.

In the above method for decoding a mobile phone based two-dimensional code of the present invention, the step of obtaining the two-dimensional code image further comprises: obtaining the two-dimensional code image by using an image capture equipment on mobile phones and identifying the size of the two-dimensional code image.

In the above method for decoding a mobile phone based two-dimensional code of the present invention, the step of quantizing the black-and-white dots containing in the black-and-white image to be binary data information further comprises:

obtaining a maximum value and a minimum value of reflectance of the dots contained in the black-and-white image;

setting an average of the maximum value and the minimum value of the reflectance of dots as an intermediate threshold;

quantizing dots contained in the two-dimensional code black-and-white image referring to the intermediate threshold that acts as a reference value:

quantizing the reflectance values of the dots that are less than the reference value to be 0;

quantizing the reflectance values of the dots that are greater than the reference value to be 1; and quantizing entire binary data information contained in the black-and-white image.

In the above method for decoding a mobile phone based two-dimensional code of the present invention, the step of parsing the binary data information into text information by using the preset decoding algorithm further comprises:

determining whether there is application information contained in valid fields at the starting position of the parsed text information:

if it is determined that the text information contains application information, the corresponding application is performed, otherwise, it is determined that the text information is plain text information.

In the above method for decoding a mobile phone based two-dimensional code of the present invention, the specific determining steps for determining whether there is application information contained in the text information comprise:

determining whether "http://" or "https://" is contained in the valid fields at the starting position of the text information:

if there is "http://" or "https://" contained in the valid fields at the starting position of the text information, it is determined that there is information relating to a web application in the text information, and the associated web pages are opened in accordance with the content included in the text information; otherwise determining whether "TEL:" is contained in the valid fields at the starting position of the text information:

if there is "TEL:" contained in the valid fields at the starting position of the text information, determining that there is information relating to a phone call application in the text information and the associated phone call function is activated in accordance with the content included in the text information; otherwise determining whether "SMSTO" is contained in the valid fields at the starting position of the text information:

if there is "SMSTO" contained in the valid fields at the starting position of the text information, determining that there is information relating to a short message application in the text information and the associated short message function is activated in accordance with the content included in the text information; otherwise determining whether "mecard" is contained in the valid fields at the starting position of the text information:

if there is "mecard" contained in the valid fields at the starting position of the text information, determining that there is information relating to an address book application in the text information and the associated address book function is activated in accordance with the content included in the text information; and otherwise determining that the text information is a plain text information.

A system for encoding a mobile phone based two-dimensional code comprises:

an information obtaining module, configured to obtain data information inputted by a user and convert the data information into encoded characters;

a bitmap transforming module, configured to transform the character-encoded into a bitmap file containing binary data according to a predetermined encoding rule; and a two-dimensional code transforming module, configured to obtain the binary data information contained in the bitmap file and transform the binary data information into a two-dimensional code by a means of superimposing layers.

In the above system for encoding a mobile phone based two-dimensional code of the present invention, the two-dimensional code transforming module further comprises a layer processing unit which is configured to adjust the bitmap file according to a resolution of each preset layer and to place the binary data information into the layers according to a predetermined rule after the binary data information is obtained, and then to superimpose the layers to transform into the two-dimensional code.

In the above system for encoding a mobile phone based two-dimensional code of the present invention, the layer processing unit superimposes layers in order after the binary data has been placed into the preset layers in light of the predetermined rule which is a 0 representing white and a 1 representing black.

A system for decoding a mobile phone based two-dimensional code comprises:

a two-dimensional code image obtaining module, configured to obtain the two-dimensional code image and place the two-dimensional code image into the preset layers after the two-dimensional code image has been adjusted depending on resolutions of the preset layers;

an image binarization processing module, configured to perform binarization processing on the two-dimensional code image placed in the layers to generate a two-dimensional code black-and-white image, to quantize the black-and-white dots contained in the two-dimensional code black-and-white image into binary data information, and to identify the version and the error correction level contained in the two-dimensional code according to the binary data information; and an information decoding module, configured to parse the binary data information into text information by using a preset decoding algorithm.

In the above system for decoding a mobile phone based two-dimensional code of the present invention, the image binarization processing module further comprises a data information obtaining unit, which is configured to obtain a maximum value and a minimum value of the reflectance of dots contained in the two-dimensional code black-and-white image and set the average of the maximum value and the minimum value of the reflectance as an intermediate threshold;

quantizing dots contained in the two-dimensional code black-and-white image referring to the intermediate threshold that acts as a reference value:

quantizing the reflectance values of the dots that are less than the reference value to be 0 and the reflectance values of the dots that are greater than the reference value to be 1; in this manner the entire binary data information contained in the black-and-white image are quantized.

In the above system for decoding a mobile phone based two-dimensional code of the present invention, the information decoding module further comprises an application determination unit, which is configured to determine whether there is application information contained in valid fields at the starting position of the parsed text information.

if it is determined that the text information contains application information, the corresponding application is performed, otherwise, it is determined that the text information is a plain text information.

In the above system for decoding a mobile phone based two-dimensional code of the present invention, the application determination unit comprises the following subunits:

a web application determining subunit, configured to determine whether "http://" or "https://" is contained in the valid fields at the starting position of the text information, determining that there is information relating to a web application in the text information and opening the associated web pages in accordance with the content included in the text information if there is "http://" or "https://" in the valid fields at the starting position of the text information;

a phone call application determining subunit, configured to determine whether "TEL:" is contained in the valid fields at the starting position of the text information, determining that there is information relating to a phone call application in the text information and activating the associated phone call function in accordance with the content included in the text information if there is "TEL:" in the valid fields at the starting position of the text information;

a short message application determining subunit, configured to determine whether "SMSTO" is contained in the valid fields at the starting position of the text information, determining that there is information relating to a short message application in the text information and activating the associated short message function in accordance with the content included in the text information if there is "SMSTO" in the valid fields at the starting position of the text information; and an address book application determining subunit, configured to determine whether "mecard" is contained in the valid fields at the starting position of the text information, determining that there is information relating to an address book application in the text information and activating the associated address book function in accordance with the content included in the text information if there is "mecard" contained in the valid fields at the starting position of the text information, or otherwise determining that the text information is a plain text information.

The present invention provides a method and a system for encoding and decoding a mobile phone based two-dimensional code, by means of obtaining the data information inputted by a user, converting the data information into a bitmap file containing binary data, and transforming them into a two-dimensional code, or alternatively, after the two-dimensional code image is obtained, adjusted and placed into preset layers, by means of performing binarization processing on a two-dimensional code image to obtain binary data information and parsing the binary data information into text information by using a preset decoding algorithm, thereby the encoding and decoding of two-dimensional code on mobile phones are carried out.

The foregoing method and the system employ software applications to be embedded on mobile phones, in this way, and the encoding and decoding functions of a two-dimensional code on mobile phones are embodied to assist mobile phone users in daily life and acquire a beneficial effect, such as obtainment and delivery of information by way of the two-dimensional code encoding and decoding functions of mobile phones, especially for feature phone users.

DETAILED DESCRIPTION OF THE INVENTION

The present inventions provides a method and a system for encoding and decoding a mobile phone based two-dimensional code, and embodiments of the present invention will be further described in combination with the accompanying drawings below.

Figure 1:
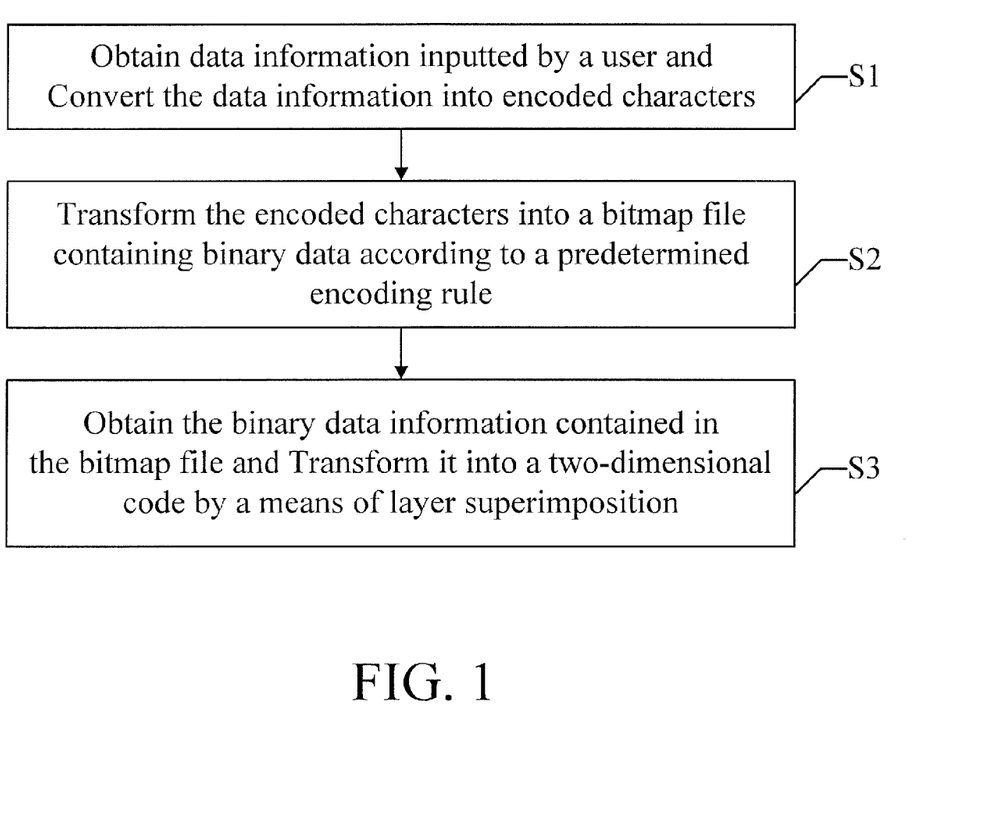
FIG. 1 is a flowchart showing steps of a method for encoding a mobile phone based two-dimensional code according to the present invention.

A method for encoding a mobile phone based two-dimensional code comprises the following steps:

S1: Obtaining data information inputted by a user and converting the data information into the encoded characters. Receiving data information inputted by a user via a keypad of a mobile phone, the data information includes character information for a target two-dimensional code and data corresponding to an error correction level of the two-dimensional code preset by the user.

First, the mobile phone converts the received data information into encoded characters according to the character encoding library preset inside of the phone. Preferably, the received data information is converted into being UTF8 encoded, and the received data information can also be converted into other character encoded forms.

Next, after the received data information has been converted into the encoded characters, a matching version of the two-dimensional code is determined through calculation for the converted data information according to the error correction level predetermined by the user and a string length corresponding to the character encoding scheme, and then the number of modules corresponding to the two-dimensional code desired to be generated can be figured out according to the determined version of the two-dimensional code.

S2: Transforming the encoded characters into a bitmap file containing binary data according to a predetermined encoding rule. According to a predetermined encoding rule, the encoded characters are transformed into a binary bitmap containing only 0 or 1, in which the binary bitmap is a dot matrix file of the data information that contains 0 and 1.

S3: Obtaining the binary data information contained in the bitmap file and transforming the bitmap file into a two-dimensional code by a means of layer superimposition based on the binary data information.

The binary data information contained in the transformed bitmap file are obtained, and the binary data containing only 0 or 1 is placed into preset layers in light of a predetermined rule which is a 0 representing white and a 1 representing black. After the binary data has been placed into the preset layers, the layers are superimposed in order to form a two-dimensional code image. The two-dimensional code image is conserved as an image file and displayed.

Specifically, the layers that correspond to the bitmap file are created in a back-end which serves mobile phones, and resolutions of the layers can be 800×800, but can also be set manually according to requirements. Besides, it is possible that the layers are created by default on system.

After the bitmap file has been adjusted according to the resolutions of the layers and placed into the created layers, the bitmap file is transformed into the two-dimensional code on the basis of the binary data information contained in the bitmap file.

Figure 2:
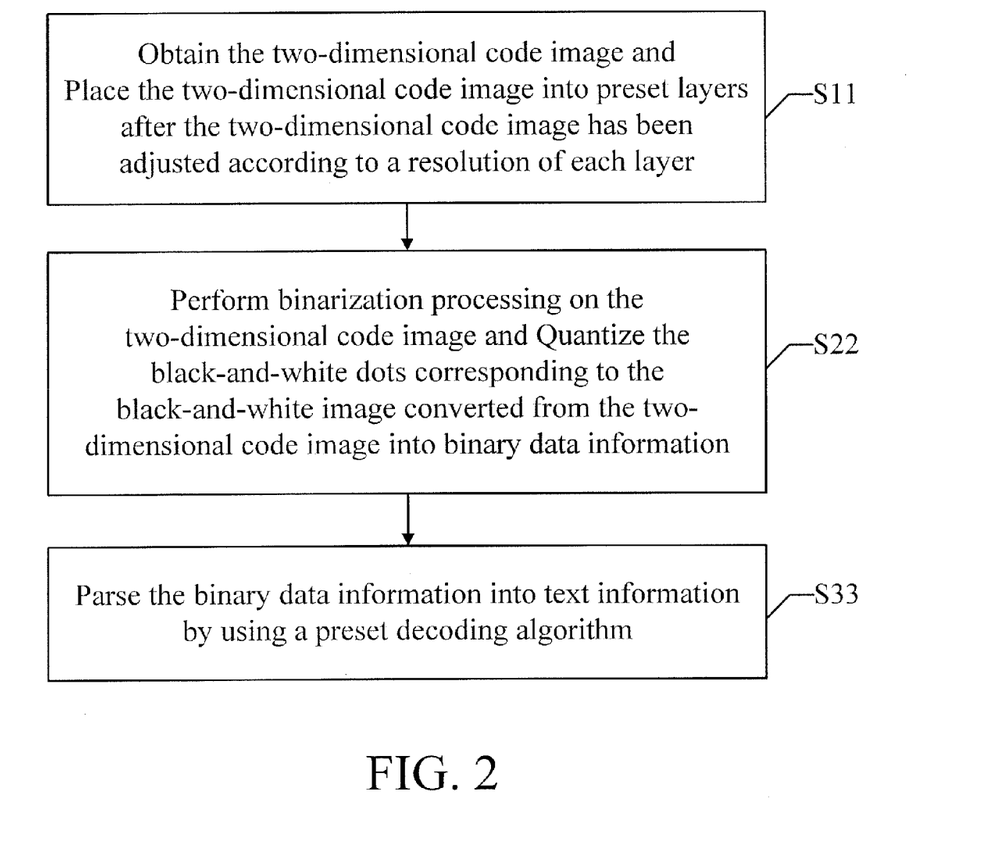
FIG. 2 is a flowchart showing steps of a method for decoding a mobile phone based two-dimensional code according to the present invention.

In light of the foregoing encoding design ideas regarding a two-dimensional code implementation for mobile phones, a method for decoding a mobile phone based two-dimensional code is also provided in the present invention. As shown in FIG. 2, the method comprises the following steps:

S11: Obtaining the two-dimensional code image and place the two-dimensional code image into preset layers after the two-dimensional code image has been adjusted according to resolutions of the layers.

Specifically, the two-dimensional code image desired to be decoded is obtained by way of an image capture equipment on mobile phones such as Bluetooth device or camera. Furthermore, the size of the two-dimensional code image is identified and adjusted according to the resolutions of the preset layers in light of processing methods preset on a user's mobile phone. The obtained two-dimensional code image is placed into the preset layers after the two-dimensional code image has been size adjusted.

S22: Performing binarization processing on the two-dimensional code image which has been placed into the layers and quantizing the black-and-white dots corresponding to the black-and-white image converted from the two-dimensional code image to be binary data information. Further, identifying the version and the error correction level contained in the two-dimensional code according to the binary data information.

Binarization processing is performed on the two-dimensional code image so that the two-dimensional code image is converted into the black-and-white image, and the binary data information contained in the two-dimensional code image can be generated from the black-and-white image. Specific steps are that the black-and-white image is obtained when the two-dimensional code image has been finished with binarization processing; a maximum value and a minimum value of the reflectance of dots contained in the black-and-white image are obtained, the average of the maximum value and the minimum value of the reflectance of the dots is set as an intermediate threshold; the intermediate threshold is as a reference value to quantize the dots contained in the black-and-white image: quantizing the reflectance values of the dots that are less than the reference value to be 0 and the reflectance values of the dots that are greater than the reference value to be 1, in this manner the entire binary data information contained in the black-and-white image can be quantized.

S33: Parsing the binary data information into text information by using a preset decoding algorithm.

By means of the open-source decoding algorithm, the binary data information is parsed into text information in light of a predetermined rule. Specifically, it is required to determine whether there is application information contained in valid fields at the starting position of the parsed text information after the contained information in the two-dimensional code image has been parsed out. If it is determined that the text information contains application information, the corresponding application is performed, or otherwise it is determined that the text information is a plain text information.

Further, the specific determination steps for determining whether there is application information contained in the text information comprise:

S331: Determining whether "http://" or "https:/" is contained in the valid fields at the starting position of the text information, if there is "http://" or "https://" contained in the valid fields at the starting position of the text information, determining that there is information relating to a web application in the text information and the associated web pages are opened in accordance with the content included in the text information, or otherwise proceed to step S332.

When the content including "http://" or "https://" is discovered in the valid fields at the starting position of the parsed text information, it indicates that the two-dimensional code corresponding to the text information relates to website address information. It is operable to enter the associated website in accordance with the website address contained in the text information.

S332: Determining whether "TEL:" is contained in the valid fields at the starting position of the text information, if there is "TEL:" contained in the valid fields at the starting position of the text information, determining that there is information relating to a phone call application in the text information and the associated phone call function is activated in accordance with the content included in the text information, otherwise proceed to step S333.

Similar to the foregoing step S331, when the content including "TEL:" is discovered in the valid fields at the starting position of the parsed text information, it indicates that the two-dimensional code corresponding to the text information relates to phone number information, and the phone call function is activated in accordance with the phone number contained in the text information.

S333: Determining whether "SMSTO" is contained in the valid fields at the starting position of the text information, if there is "SMSTO" contained in the valid fields at the starting position of the text information, determining that there is information relating to a short message application in the text information and the associated short message function is activated in accordance with the content included in the text information, or otherwise proceeds to step S334.

When the content including "SMSTO" is discovered in the valid fields at the starting position of the parsed text information, it indicates that the two-dimensional code corresponding to the text information relates to short message information, and the short message application on the mobile phone is activated in accordance with the short message contained in the text information.

S334: Determining whether "mecard" is contained in the valid fields at the starting position of the text information, if there is "mecard" contained in the valid fields at the starting position of the text information, determining that there is information relating to an address book application in the text information and the associated address book function is activated in accordance with the content included in the text information, otherwise it is determined that the text information is a plain text information.

When the content including "mecard" is discovered in the valid fields at the starting position of the parsed text information, it indicates that the two-dimensional code corresponding to the text information relates to address book information, and the address book application on the mobile phone is activated in accordance with the short message contained in the text information.

Figure 3:
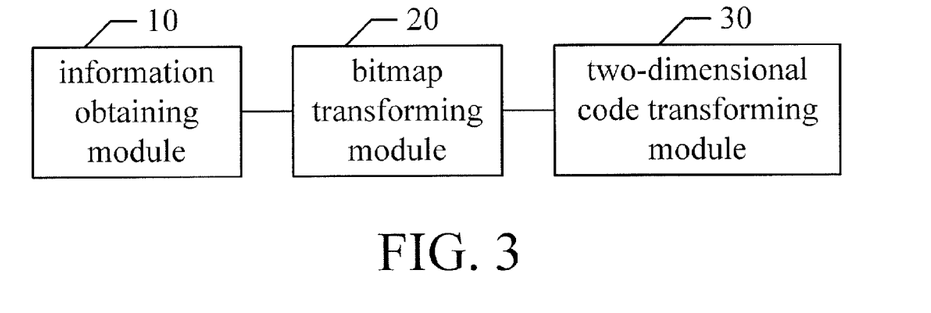
FIG. 3 is a schematic diagram showing a system for encoding a mobile phone based two-dimensional code according to the present invention.

In light of the same design concept as the aforementioned method for encoding a mobile phone based two-dimensional code, the present invention also provides a system for encoding a mobile phone based two-dimensional code, as shown in FIG. 3, the system comprises following modules:

an information obtaining module 10, configured to obtain data information inputted by a user and convert the data information into encoded characters, specifically as described in step S1;

a bitmap transforming module 20, configured to transform the encoded characters into a bitmap file containing binary data according to a predetermined encoding rule, specifically as described in step S2; and a two-dimensional code transforming module 30, configured to obtain the binary data information contained in the bitmap file and to transform the binary data information into a two-dimensional code by a means of superimposing layers, specifically as described in step S3.

The two-dimensional code transforming module includes a layer processing unit configured to adjust the bitmap file according to a resolution of each preset layer, place the binary data information contained in the bitmap file into each preset layer according to the predetermined rule and orderly superimpose the layers.

The binary data is 0 or 1. According to a predetermined rule which is a 0 representing white and a 1 representing black, the layer processing unit is configured to place the binary data information into each preset layer and orderly superimpose the layers.

Figure 4:
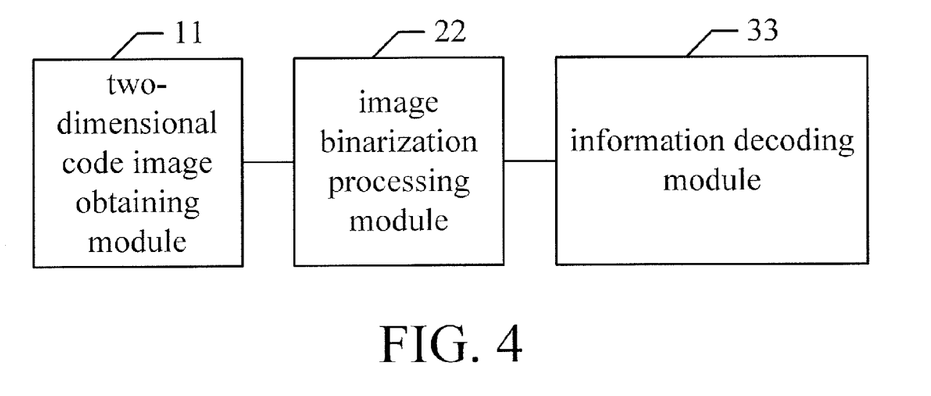
FIG. 4 is a schematic diagram showing a system for decoding a mobile phone based two-dimensional code according to the present invention.

According to the above-described decoding a two-dimensional code method implemented on a mobile phone, the present invention also provides a system for decoding a mobile phone based two-dimensional code, as shown in FIG. 4, the decoding system comprises following modules:

a two-dimensional code image obtaining module 11, configured to obtain the two-dimensional code image and place the two-dimensional code image into the preset layers after the two-dimensional code image has been adjusted depending on resolutions of the preset layers, specifically as described in step S11;

an image binarization processing module 22, configured to perform black-and-white processing on the two-dimensional code image placed in the layers configured to generate the black-and-white image, to quantize the black-and-white dots corresponding to the black-and-white image into binary data information, and to identify the version and the error correction level contained in the two-dimensional code according to the binary data information, specifically as described in step S22; and an information decoding module 33, configured to parse the binary data information into text information by using a preset decoding algorithm, specifically as described in step S33.

Furthermore, the image binarization processing module includes a data information obtaining unit. The data information obtaining unit is configured to obtain a maximum value and a minimum value of the reflectance of dots contained in the black-and-white image and set the average of the maximum value and the minimum value of the reflectance as an intermediate threshold, which is as a reference value to quantize the dots contained in the black-and-white image; quantizing the reflectance values of the dots in the black-and-white image that are less than the reference value to be 0 and quantizing the reflectance values of the dots in the black-and-white image that are greater than the reference value to be 1; in this manner the entire binary data information contained in the black-and-white image can be quantized.

In order to further process the parsed information, the information decoding module 33 further includes an application determination unit, which is configured to determine whether there is application information contained in valid fields at the starting position of the parsed text information. If it is determined that the text information contains application information, the corresponding application is performed, otherwise, it is determined that the text information is a plain text information.

The application determination unit comprises following subunits:

a web application determining subunit, configured to determine whether "http://" or "https://" is contained in the valid fields at the starting position of the text information, determining that there is information relating to a web application in the text information and opening the associated web pages in accordance with the content included in the text information if there is "http:/" or "https://" in the valid fields at the starting position of the text information;

a phone call application determining subunit, configured to determine whether "TEL:" is contained in the valid fields at the starting position of the text information, determining that there is information relating to a phone call application in the text information and activating the associated phone call function in accordance with the content included in the text information if there is "TEL:" in the valid fields at the starting position of the text information;

a short message application determining subunit, configured to determine whether "SMSTO" is contained in the valid fields at the starting position of the text information, determining that there is information relating to a short message application in the text information and activating the associated short message function in accordance with the content included in the text information if there is "SMSTO" in the valid fields at the starting position of the text information; and an address book application determining subunit, configured to determine whether "mecard" is contained in the valid fields at the starting position of the text information, determining that there is information relating to an address book application in the text information and activating the associated address book function in accordance with the content included in the text information if there is "mecard" contained in the valid fields at the starting position of the text information, or otherwise determining that the text information is a plain text information.

A method and a system for encoding and decoding a mobile phone based two-dimensional code are provided, by means of obtaining the data information inputted by a user, converting the data information into a bitmap file containing binary data, and transforming them into a two-dimensional code, or alternatively, after the two-dimensional code image is obtained, adjusted and placed into preset layers, by means of performing binarization processing on a two-dimensional code image to obtain binary data information and parsing the binary data information into text information by using a preset decoding algorithm, thereby the encoding and decoding of two-dimensional code on mobile phones are carried out. The foregoing method and the system employ software applications to be embedded on mobile phones, in this way, and the encoding and decoding functions of a two-dimensional code on mobile phones are embodied to facilitate mobile phone users in obtaining and delivering information in daily life using two-dimensional code encoding and decoding functions of mobile phones, especially for feature phone users.

It should be understood that this invention is not limited to the foregoing description of the disclosed embodiments. Various changes and modifications can be made to the invention in light of the above detailed description by those skilled in the art. These changes and modifications are possible within the scope of the invention as defined by the following claims.

What is claimed is:

1. A method for decoding a mobile phone based two-dimensional code, comprising:
  obtaining a two-dimensional code image and placing the two-dimensional code image into preset layers after the obtained two-dimensional code image has been adjusted depending on a resolution of each layer;
  performing binarization processing on the two-dimensional code image which has been placed into the layers to generate a black-and-white image;
  quantizing the black-and-white dots containing in the black-and-white image into binary data information;
  identifying the version and the error correction level of the two-dimensional code contained in the two-dimensional code image according to the binary data information;
  parsing the binary data information into text information by using a preset decoding algorithm;
  wherein the step of parsing the binary data information into text information by using a preset decoding algorithm further comprises:
  determining whether there is a application information contained in valid fields at the starting position of the parsed text information:
  if it is determined that the text information contains application information, the corresponding application is performed, otherwise, it is determined that the text information is a plain text information;
  wherein the specific determining steps for determining whether there is application information contained in the to information comprises;
  determining whether "http://" or "https://" is contained in the valid fields at a starting position of the text information;
  if there is "http://" or "https://" contained in the valid fields at the starting position of the text information, it is determined that there is information relating to a web application in the text information, and the associated web pages are opened in accordance with the content included in the text information; otherwise
  determining whether "TEL:" is contained in the valid fields at the starting position of the text information:
  if there is "TEL:" contained in the valid fields at the starting position of the text information, determining that there is information relating to a phone call application in the text information and the associated phone call function is activated in accordance with the content included in the text information; otherwise
  determining whether "SMSTO" is contained in the valid fields at the starting position of the text information:
  if there is "SMSTO" contained in the valid fields at the starting position of the text information, determining that there is information relating to a short message application in the text information and the associated short message function is activated in accordance with the content included in the text information; otherwise
  determining whether "mecard" is contained in the valid fields at the starting position of the text information:
  if there is "mecard" contained in the valid fields at the starting position of the information, determining that there is information relating to an address book application in the text information and the associated address book function is activated in accordance with the content included in the text information; and otherwise
  determining that the text information is a plain text information.

2. The method for decoding a mobile phone based two-dimensional code according to claim 1, wherein the step of obtaining the two-dimensional code image further comprises:
  obtaining the two-dimensional code image by using an image capture equipment on mobile phones and identifying the size of the two-dimensional code image.

3. The method for decoding a mobile phone based two-dimensional code according to claim 1, wherein the step of quantizing the black-and-white dots containing in the black-and-white image into binary data information further comprises:
  obtaining a maximum value and a minimum value of the reflectance of the dots contained in the black-and-white image;
  setting an average of the maximum value and the minimum value of the reflectance of dots as an intermediate threshold;
  quantizing dots contained in the two-dimensional code black-and-white image referring to the intermediate threshold that acts as a reference value:
  quantizing the reflectance values of the dots that are less than the reference value to be 0;
  quantizing the reflectance values of the dots that are greater than the reference value to be 1; and
  quantizing entire binary data information contained in the black-and-white image.

4. A system for decoding mobile phone based two-dimensional code, comprising:
  a two-dimensional code image obtaining module, configured to obtain the two-dimensional code image and place the two-dimensional code image into the preset layers after the two-dimensional code image has been adjusted depending on resolutions of the preset layers;
  an image binarization processing module, configured to perform binarization processing on the two-dimensional code image placed in the layers to generate two-dimensional code black-and-white image, to quantize the black-and-white dots contained in the two-dimensional code black-and-white image into binary data information, and to identify the version and the error correction level contained in the two-dimensional code according to the binary data information; and
  an information decoding module, configured to parse the binary data information into text information by using a preset decoding algorithm;
  wherein the information decoding module further comprises an application determination unit configured to determine whether there is application information contained in valid fields at the starting position of the parsed text information;
  if it is determined that the text information contains application information, the corresponding application is performed, otherwise, it is determined that the text information is a plain text information;
  wherein the application determination unit comprise the following subunits;
  a web application determining subunit, configured to determine whether "http://" or "https://" is contained in the valid fields at the starting position of the text information, determining that there is information relating to a web application in the text information and opening the associated web pages in accordance with the content included in the text information if there is "http://" or "https://" in the valid fields at a starting position of the text information;

phone call application determining subunit, configured to determine whether "TEL" is contained in the valid fields at the starting position of the text information, determining that there is information relating to a phone call application in the text information and activating the associated phone call function in accordance with the content included in the text information if there is "TEL:" in the valid fields at the starting position of the text information;

a short message application determining subunit, configured to determine whether "SMSTO" is contained in the valid fields at the starting position of the text information, determining that there is information relating to a short message application in the text information and activating the associated short message function in accordance with the content included in the text information if there is "SMSTO" in the valid fields at the starting position of the text information; and an address book application determining subunit, configured to determine whether "mecard" is contained in the valid fields at the starting position of the text information, determining that there is information relating to an address book application in the text information and activating the associated address book function in accordance with the content included in the text information if there is "mecard" contained in the valid fields at the starting position of the text information, otherwise determining that the text information is a plain text information.

5. The system for decoding a mobile phone based two-dimensional code according to claim 4, wherein the image binarization processing module further comprises a data information obtaining unit;

the data information obtaining unit is configured to obtain a maximum value and a minimum value of the reflectance of dots contained in the two-dimensional code black-and-white image and set the average of the maximum value and the minimum value of the reflectance as an intermediate threshold;

quantizing dots contained in the two-dimensional code black-and-white image referring to the intermediate threshold that acts as a reference value:

quantizing the reflectance values of the dots that are less than the reference value to be 0 and the reflectance values of the dots that are greater than the reference value to be 1, in this manner the entire binary data information contained in the black-and-white image are quantized.

* * * * *